(12) United States Patent
Bookbinder et al.

(10) Patent No.: US 8,385,701 B2
(45) Date of Patent: Feb. 26, 2013

(54) LOW BEND LOSS OPTICAL FIBER

(75) Inventors: Dana Craig Bookbinder, Corning, NY (US); Ming-Jun Li, Horseheads, NY (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 223 days.

(21) Appl. No.: 12/773,358

(22) Filed: May 4, 2010

(65) Prior Publication Data

US 2011/0064368 A1    Mar. 17, 2011

Related U.S. Application Data

(60) Provisional application No. 61/241,636, filed on Sep. 11, 2009.

(51) Int. Cl.
    *G02B 6/02*    (2006.01)
(52) U.S. Cl. .......................................... 385/123; 385/124
(58) Field of Classification Search .................. 385/123, 385/124
    See application file for complete search history.

(56) References Cited

U.S. PATENT DOCUMENTS

| | | | |
|---|---|---|---|
| 4,641,917 A | 2/1987 | Glodis et al. | 350/96.33 |
| 4,852,968 A | 8/1989 | Reed | 350/96.33 |
| 5,056,888 A | 10/1991 | Messerly et al. | 385/123 |
| 5,721,800 A | 2/1998 | Kato et al. | 385/127 |
| 6,009,221 A | 12/1999 | Tsuda | 385/123 |
| 6,175,680 B1 | 1/2001 | Arai et al. | 385/127 |
| 6,363,196 B1 | 3/2002 | Rousseau et al. | 385/127 |
| 6,625,362 B2 | 9/2003 | Inagaki et al. | 385/127 |
| 6,792,188 B2 * | 9/2004 | Libori et al. | 385/125 |
| 6,842,566 B2 | 1/2005 | Ishikawa et al. | 385/37 |
| 6,901,196 B2 | 5/2005 | Takahashi et al. | |
| 6,904,218 B2 | 6/2005 | Sun et al. | 385/127 |
| 6,999,667 B2 | 2/2006 | Jang et al. | 385/124 |
| 7,043,125 B2 | 5/2006 | Diep et al. | 385/123 |
| 7,164,835 B2 | 1/2007 | Matsuo et al. | 385/127 |
| 7,203,397 B2 | 4/2007 | Ouchi et al. | 385/28 |
| 7,239,784 B2 | 7/2007 | Hayami et al. | 385/123 |
| 7,366,387 B2 | 4/2008 | Matsuo et al. | 385/123 |
| 7,403,689 B2 * | 7/2008 | Koch et al. | 385/125 |
| 7,440,663 B2 | 10/2008 | Matsuo et al. | 385/123 |
| 7,505,657 B2 | 3/2009 | Matsuo et al. | 385/123 |
| 7,526,168 B2 | 4/2009 | Matsuo et al. | 385/127 |
| 7,526,169 B2 | 4/2009 | Bickham et al. | 385/127 |

(Continued)

FOREIGN PATENT DOCUMENTS

| | | |
|---|---|---|
| EP | 2175295 A1 | 4/2010 |
| JP | 2007-108764 | 4/2007 |

(Continued)

OTHER PUBLICATIONS

Patent Abstract of Japanese Publication #63-295358; Publication date: Dec. 1, 1988; Kazushige et al.

(Continued)

*Primary Examiner* — K. Cyrus Kianni
(74) *Attorney, Agent, or Firm* — Robert L. Carlson

(57) ABSTRACT

An optical fiber includes a central glass core region comprising maximum refractive index delta percent $\Delta_1$, a first inner annular region surrounding said core comprising refractive index delta percent $\Delta_2$, a depressed annular region surrounding said inner annular region and comprising $\Delta_3$ and a third annular region surrounding the depressed annular region comprising refractive index delta percent $\Delta_4$; wherein $\Delta_{1MAX} > \Delta_4 > \Delta_2 > \Delta_3$. The difference between $\Delta_4$ and $\Delta_2$ is greater than 0.01 and profile volume, $|V_3|$ is at least 60% $\Delta\mu m^2$.

16 Claims, 1 Drawing Sheet

U.S. PATENT DOCUMENTS

| | | | |
|---|---|---|---|
| 7,529,453 B2 * | 5/2009 | Miyabe et al. | 385/125 |
| 2002/0061176 A1 * | 5/2002 | Libori et al. | 385/125 |
| 2002/0186941 A1 | 12/2002 | Hsu et al. | 385/123 |
| 2003/0016927 A1 | 1/2003 | Soufiane et al. | 385/127 |
| 2003/0190127 A1 | 10/2003 | Sillard et al. | 385/123 |
| 2003/0223716 A1 | 12/2003 | Christoff et al. | 385/124 |
| 2004/0114892 A1 | 6/2004 | Chiang et al. | 385/123 |
| 2005/0175303 A1 | 8/2005 | Jang et al. | 385/124 |
| 2005/0180709 A1 | 8/2005 | Park et al. | 385/124 |
| 2005/0185906 A1 | 8/2005 | Bickham et al. | 385/124 |
| 2006/0067632 A1 * | 3/2006 | Broeng et al. | 385/96 |
| 2006/0078009 A1 * | 4/2006 | Katayama et al. | 372/6 |
| 2006/0115224 A1 | 6/2006 | Kutami et al. | 385/123 |
| 2007/0122095 A1 * | 5/2007 | Broeng et al. | 385/125 |
| 2007/0189684 A1 | 8/2007 | Matsuo et al. | 385/123 |
| 2007/0189699 A1 | 8/2007 | Matsuo et al. | 385/142 |
| 2008/0101755 A1 | 5/2008 | Matsuo et al. | 385/127 |
| 2010/0157418 A1 * | 6/2010 | Dong et al. | 359/341.3 |

FOREIGN PATENT DOCUMENTS

| | | |
|---|---|---|
| WO | WO2009/104724 | 8/2009 |

OTHER PUBLICATIONS

International Searching Authority, PCT Notification of Transmittal of the International Search Report and the Written Opinion of the International Searching Authority, Nov. 17, 2010.

* cited by examiner

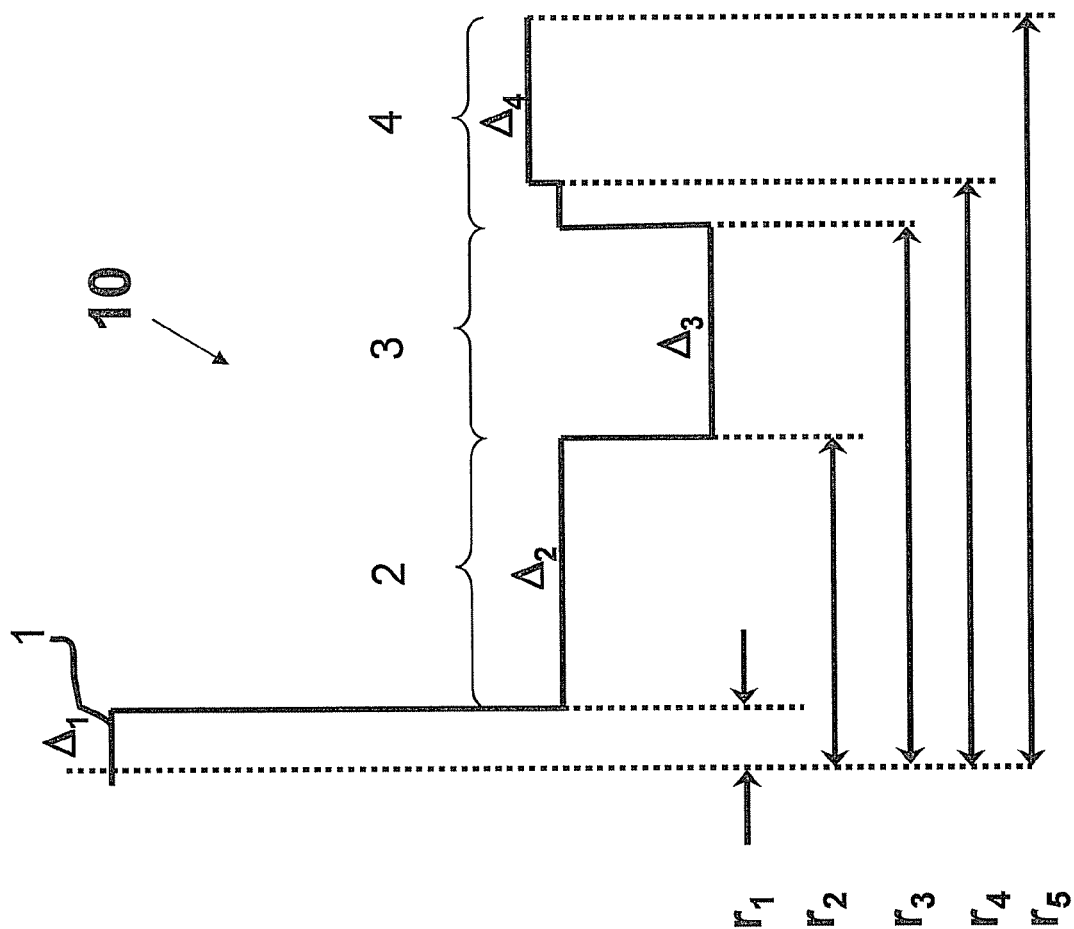

US 8,385,701 B2

LOW BEND LOSS OPTICAL FIBER

CROSS-REFERENCE TO RELATED APPLICATIONS

This application claims the benefit of, and priority to U.S. Provisional Patent Application No. 61/241,636 filed on Sep. 11, 2009 entitled, "Low Bend Loss Optical Fiber", the content of which is relied upon and incorporated herein by reference in its entirety.

BACKGROUND

The disclosure relates to optical fiber, and more particularly to single mode optical fibers which have low bend loss at 1550 nm.

Low bend loss optical fibers are attractive for fiber to the home applications because they can lower the installation costs. To reduce the bending loss, profile designs with a fluorine doped ring or randomly distributed voids have been proposed. However, it is challenging to achieve bend insensitive fiber and at the same time to meet G.652 or other fiber standards (MFD, cable cutoff, dispersion, etc.).

SUMMARY

Single mode optical fibers are disclosed herein which include a central glass core region comprising maximum refractive index delta percent $\Delta_1$, a first inner annular region surrounding said core comprising refractive index delta percent $\Delta_2$, a depressed annular region surrounding said inner annular region and comprising $\Delta_3$ and a third annular region surrounding the depressed annular region comprising refractive index delta percent $\Delta_4$, wherein $\Delta_{1MAX} > \Delta_4 > \Delta_2 > \Delta_3$. The depressed index region comprises a profile volume, $V_3$, equal to:

$$2\int_{R_2}^{R_3} \Delta(r) r\, dr;$$

In some embodiments, the difference between $\Delta_4$ and $\Delta_2$ is greater than 0.01 and the magnitude of the profile volume $|V_3|$ is at least 60% $\mu m^2$. The fiber preferably exhibits a cable cutoff less than 1260 nm, and a bend loss at 1550 nm, when wound on a 10 mm diameter mandrel, of less than 0.2 dB/turn, more preferably less than 0.1 dB/turn, even more preferably less than 0.075 dB/turn, and most preferably less than 0.05 dB/turn.

In some preferred embodiments, the fiber core refractive index profile is designed so that the fiber exhibits a zero dispersion wavelength between 1300 and 1324 nm a mode field diameter between about 8.2 and 9.5 microns at 1310 nm, and a cable cutoff less than 1260 nm.

The optical fiber may comprise a central glass core region comprising maximum refractive index delta percent $\Delta_1$, a first inner annular region surrounding said core comprising refractive index delta percent $\Delta_2$, a depressed annular region surrounding said inner annular region and comprising $\Delta_3$ and a third annular region surrounding the depressed annular region comprising refractive index delta percent $\Delta_4$; said depressed annular region having a profile volume, $V_3$, equal to:

$$2\int_{R_2}^{R_3} \Delta(r) r\, dr;$$

wherein the central glass core region comprises a maximum refractive index delta percent $\Delta_1$ and radius $r_1$ sufficient to result in a mode field diameter of greater than 8.2 microns at 1310 nm, and wherein the magnitudes of the difference between $\Delta_4$ and $\Delta_2$ and the magnitude of $|V_3|$ are both sufficiently large to result in a 22 m cable cutoff less than 1260 nm and a bend loss at 1550 nm, when wound on a 10 mm diameter mandrel, of less than 0.2 dB/turn, more preferably less than 0.1 dB/turn, even more preferably less than 0.075 dB/turn, and most preferably less than 0.05 dB/turn. The magnitudes of the difference between $\Delta_4$ and $\Delta_2$ is preferably greater than 0.01, more preferably greater than 0.02, even more preferably greater than 0.05. In some embodiments the difference between $\Delta_4$ and $\Delta_2$ is greater than 0.08. Preferably the difference between $\Delta_4$ and $\Delta_2$ is less than 0.1. In some embodiments the difference between $\Delta_4$ and $\Delta_2$ is preferably greater than 0.01 and less than 0.1. In some embodiments the difference between $\Delta_4$ and $\Delta_2$ is preferably greater than 0.01 and less than about 0.05. The depressed annular region preferably comprises a profile volume $V_3$ such that $|V_3|$ is at least 60% $\Delta\mu m^2$, more preferably greater than about 65% $\Delta\mu m^2$, and in some cases greater than about 70% $\Delta\mu m^2$ or 80% $\Delta\mu m^2$. In some embodiments, the depressed annular region profile volume $V_3$ so that $|V_3|$ is less than about 120% $\Delta\mu m^2$, more preferably less than about 100% $\Delta\mu m^2$.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 1 illustrates an exemplary refractive index profile of one exemplary embodiment of optical fiber.

DETAILED DESCRIPTION

Reference will now be made in detail to the present preferred embodiment(s), an examples of which is/are illustrated in the accompanying drawings. Whenever possible, the same reference numerals will be used throughout the drawings to refer to the same or like parts.

The "refractive index profile" is the relationship between refractive index or relative refractive index and waveguide fiber radius.

The "relative refractive index percent" is defined as $\Delta\% = 100 \times (n_i^2 - n_c^2)/2n_i^2$, and as used herein $n_c$ is the average refractive index of undoped silica. As used herein, the relative refractive index is represented by $\Delta$ and its values are given in units of "%", unless otherwise specified. In cases where the refractive index of a region is less than the average refractive index of undoped silica, the relative index percent is negative and is referred to as having a depressed region or depressed index. In cases where the refractive index of a region is greater than the average refractive index of the cladding region, the relative index percent is positive. An "updopant" is herein considered to be a dopant which has a propensity to raise the refractive index relative to pure undoped $SiO_2$. A "down-dopant" is herein considered to be a dopant which has a propensity to lower the refractive index relative to pure undoped $SiO_2$. Examples of updopants include $GeO_2$, $Al_2O_3$, $P_2O_5$, $TiO_2$, Cl, Br. Examples of down dopants include fluorine and boron.

"Chromatic dispersion", herein referred to as "dispersion" unless otherwise noted, of a waveguide fiber is the sum of the material dispersion, the waveguide dispersion, and the inter-modal dispersion. In the case of single mode waveguide fibers the inter-modal dispersion is zero. Dispersion slope is the rate of change of dispersion with respect to wavelength.

The term "α-profile" or "alpha profile" refers to a relative refractive index profile, expressed in terms of $\Delta(r)$ which is in units of "%", where r is radius, which follows the equation, $$\Delta(r)=\Delta(r_o)(1-[|r-r_o|/(r_1-r_o)]^\alpha),$$

where $r_o$ is the point at which $\Delta(r)$ is maximum, $r_1$ is the point at which $\Delta(r)$ % is zero, and r is in the range $r_i \leq r \leq r_f$, where $\Delta$ is defined above, $r_i$ is the initial point of the α-profile, $r_f$ is the final point of the α-profile, and α is an exponent which is a real number.

The mode field diameter (MFD) is measured using the Peterman II method wherein, 2w=MFD, and $w^2=(2\int f^2 r\, dr/\int [df/dr]^2 r\, dr)$, the integral limits being 0 to ∞.

The bend resistance of a waveguide fiber can be gauged by induced attenuation under prescribed test conditions, for example by deploying or wrapping the fiber around a mandrel of a prescribed diameter, e.g., by wrapping 1 turn around either a 6 mm, 10 mm, or 20 mm or similar diameter mandrel (e.g. "1×10 mm diameter macrobend loss" or the "1×20 mm diameter macrobend loss") and measuring the increase in attenuation per turn.

Fiber cutoff is measured by the standard 2 m fiber cutoff test, FOTP-80 (EIA-TIA-455-80), to yield the "fiber cutoff wavelength", also known as the "2 m fiber cutoff" or "measured cutoff". The FOTP-80 standard test is performed to either strip out the higher order modes using a controlled amount of bending, or to normalize the spectral response of the fiber to that of a multimode fiber.

By cabled cutoff wavelength, or "cabled cutoff" as used herein, we mean the 22 m cabled cutoff test described in the EIA-445 Fiber Optic Test Procedures, which are part of the EIA-TIA Fiber Optics Standards, that is, the Electronics Industry Alliance—Telecommunications Industry Association Fiber Optics Standards, more commonly known as FOTP's.

One exemplary fiber 10 is shown in FIG. 1, includes a central glass core region 1 comprising maximum refractive index delta percent $\Delta_1$. A first inner annular region 2 surrounds central core region 1, the first inner annular region 2 comprising refractive index delta percent $\Delta_2$. A depressed annular region 3 surrounds first inner annular region 2 and comprises $\Delta_3$. A third annular region 4 surrounds the depressed annular region 3 and comprises refractive index delta percent $\Delta_4$. In preferred embodiments, $\Delta_1 > \Delta_4 > \Delta_2 > \Delta_3$. In the embodiment illustrated in FIG. 1, regions 1, 2, 3, and 4 are immediately adjacent one another. However, this is not required, and alternatively additional core or cladding regions may be employed. For example, an outer cladding region (not shown) may be employed which surrounds annular region 4 and comprises a lower refractive index delta percent $\Delta_5$ than annular region 4.

Central core region 1 comprises an outer radius $r_1$ which is defined as where a tangent line drawn through maximum slope of the refractive index of central core region 1 crosses the zero delta line. Core region 1 preferably exhibits a refractive index delta percent, $\Delta_1$, between about 0.3 to 0.5, more preferably between about 0.32 to 0.45. In some embodiments, $\Delta_1$ is preferably between 0.32 to 0.40. Core radius $r_1$ is preferably between 3 and 5 microns, more preferably between about 3.5 to 4.5 microns. Central core region 1 preferably comprises an alpha between about 10-100.

In the embodiment illustrated in FIG. 1, first annular region 2 surrounds central core region 1 and comprises inner radius $r_1$ and outer radius $r_2$, $r_1$ being defined as above and $r_2$ being defined as where a tangent line drawn through the maximum slope of the refractive index of the inner refractive index portion of annular region 3 crosses the zero delta line. In some cases the refractive index in region 2 is essentially flat. In other cases there can be a gradient index profile. Still in other cases there can be fluctuations as a result of small profile design or process variations. In some embodiments, the first annular portion comprises silica which is substantially undoped with either fluorine or germania, i.e., such that the region is essentially free of fluorine and germania. First annular region 2 comprises refractive index delta percent $\Delta_2$ which is calculated using:

$$\Delta_2 = \int_{r1}^{r2} \Delta(r)\,dr/(r_2-r_1)$$

The first inner annular region preferably exhibits a width between about 4 to 10 microns, more preferably between about 5 to 7 microns. The ratio of the core radius $r_1$ over the inner annular region 2 radius $r_2$ is preferably between about 0.35 to 0.55, more preferably between about 0.40 to 0.50.

Depressed annular region 3 comprises inner radius $r_2$ and outer radius $r_3$, $r_3$ being defined as the point between depressed annular region 3 and third annular region 4 where $d\Delta(r)/dr$ ("r" represents the radius), the derivative value of the radial profile of the relative refractive index difference $\Delta(r)$, is a maximum. Depressed annular region 3 preferably comprises a delta percent between about −0.3 to −1, more preferably −0.35 to −0.7, and most preferably −0.4 to −0.6.

Depressed region 3 comprises a profile volume, $V_3$, equal to:

$$V_3 = 2\int_{r2}^{r3} \Delta(r)r\,dr$$

Preferably, $|V_3|$ is at least 60% $\Delta\mu m^2$, more preferably greater than about 65% $\Delta\mu m^2$, and in some cases greater than about 70% $\Delta\mu m^2$ or 80% $\Delta\mu m^2$. In some cases it may be desirable to maintain the depressed annular region profile volume $V_3$ so that $|V_3|$ is less than 120% $\Delta\mu m^2$, more preferably less than 100% $\Delta\mu m^2$. Depressed annular region 3 comprises refractive index delta percent $\Delta_3$ which is calculated by $\int \Delta(3)dr/(r3-r2)$ between r2 and r3. The depressed-index annular portion may, for example, comprise glass comprising a plurality of voids, or glass doped with a downdopant such as fluorine, boron or mixtures thereof, or glass doped with one or more of such downdopants and additionally glass comprising a plurality of voids. In some preferred embodiments, the depressed-index annular portion is comprised of fluorine doped silica glass. In cases where the cladding includes voids, the voids in some embodiments may be non-periodically located within the depressed-index annular portion. By "non-periodically located", we mean that when one takes a cross section (such as a cross section perpendicular to the longitudinal axis) of the optical fiber, the non-periodically disposed voids are randomly or non-periodically distributed across a portion of the fiber (e.g. within the depressed-index annular region). Similar cross sections taken at different points along the length of the fiber will reveal different randomly distributed cross-sectional hole patterns, i.e., various cross sections will have different hole patterns, wherein the distributions of voids and sizes of voids do not exactly match. That is, the voids or voids are non-periodic, i.e., they are not periodically disposed within the fiber structure. These voids are stretched (elongated) along the length (i.e. parallel to the longitudinal axis) of the optical fiber, but do not extend the entire length of the entire fiber for typical lengths of transmission fiber. It is believed that the voids extend along the length of the fiber a distance less than 20 meters, more preferably less than 10 meters, even more preferably less than 5 meters, and in some embodiments less than 1 meter. Optical fiber disclosed herein can be made by methods which utilize preform consolidation conditions which are effective to result in a significant amount of gases being trapped in the consolidated glass blank, thereby causing the formation of voids in the consolidated glass optical fiber preform. Rather than taking steps to remove these voids, the resultant preform is used to form an optical fiber with voids therein. As used herein, the diameter of a hole is the longest line segment whose endpoints are disposed on the silica internal surface defining the hole when the optical fiber is viewed in perpendicular cross-section transverse to the longitudinal axis of the fiber. Third annular region 4 surrounds the depressed annular region 3 and comprises refractive index delta percent $\Delta_4$ which is higher than the index $\Delta_4$ first annular region 2, thereby forming a region which is an "updoped" region 4 with respect to inner annular region 2. Note that it is not critical that region 4 be updoped in the sense that an index increasing dopant is included in region 4. Indeed, the same sort of "updoped" effect in annular region 4 may be achieved by downdoping inner annular region 2 with respect to annular region 4. The inner radius r4 of third annular region is defined as the point at which the higher refractive index region (compared to the refractive index of inner annular region 2) begins. In some embodiments, the higher index region of third annular region 4 may begin at the point where depressed annular region 3 ends, so that $r_3$ is equal to $r_4$. In some other embodiments, the beginning radial point $r_4$ of third annular region 4 (i.e., the region having a higher index than first annular region 2) may be spaced from the outer radial point $r_3$ of depressed annular region 3. The refractive index volume of i is calculated by $\int \Delta(4)dr/\int dr$ between inner radius of $r_4$ and the outer radius of the third annular region 4. Annular region 4 comprises a higher refractive index than first inner annular region 2. Preferably, the higher index portion (compared to first inner region 2) of annular region 4 extends at least to the point where the optical power which would be transmitted through the optical fiber is greater than or equal to 90% of the optical power transmitted, more preferably to the point where the optical power which would be transmitted through the optical fiber is greater than or equal to 95% of the optical power transmitted, most preferably to the point where the optical power which would be transmitted through the optical fiber is greater than or equal to 98% of the optical power transmitted. In preferred embodiments, the "updoped" third annular region extends at least to a radial point outside of where the majority of the light within the fiber is being transmitted, e.g., to at least a radial point of about 30 microns. Consequently, the volume $V_{4A}$ of the third annular region 4, which is defined as the volume calculated between the inner radius $R_4$ of the "updoped" third annular region 4 and a radial distance of 30 microns, is $$V_{4A} = 2\int_{r3}^{r30} \Delta_{(4-2)}(r) r\, dr$$

Preferably, $V_{4A}$ is greater than 5, more preferably greater than 7, and in some embodiments greater than 10% $\Delta$-$\mu m^2$. The volume $V_{4A}$ of the third annular region 4 may be less than the volume $V_{4B}$ of the third annular region 4, volume $V_{4B}$ as used herein being calculated from $R_3$ to 62.5 microns (i.e., the outer diameter of the 125 micron diameter fiber). In some cases, volume $V_{4B}$ may be greater than 80% $\Delta\mu m^2$, greater than 200% $\Delta\mu m^2$, or greater than 300% $\Delta\mu m^2$.

Third annular region 4 may be spaced apart from annular region 3, as shown in FIG. 1, or alternatively annular region 4 may be immediately adjacent to the annular region 3. Annular region 4 may extend to the outer most radius of the optical fiber. In some embodiments, $\Delta_4$ of the third annular region is greater than 0.01 percent. In some embodiments, the refractive index $\Delta_4$ of the third annular region is greater than 0.01 percent when compared to that of the inner annular region 2. In some embodiments, the third annular region comprises chlorine (Cl) in an amount greater than 1000 ppm, more preferably greater than 1500 ppm, and most preferably greater than 2000 ppm (0.2%) by weight.

EXAMPLES

Various embodiments will be further clarified by the following examples. It will be apparent to those skilled in the art that various modifications and variations can be made without departing from the spirit or scope of the invention.

The tables below list characteristics of modeled illustrative examples 1-18 having a refractive index as shown in FIG. 1. In particular, set forth below for each example is the refractive index delta $\Delta_1$, alpha$_1$, and outer radius $R_1$ of the central core region 1, refractive index delta $\Delta_2$ and outer radius $R_2$ and width w of the inner annular region 2, outer radius $R_3$, refractive index delta $\Delta_3$ and volume $V_3$ of the second (depressed) annular region 3, refractive index delta $\Delta_4$, volume $V_{4A}$ of the third annular region 4, which is calculated between inner radius $R_4$ of third annular region 4, and a radial distance of 30 microns, volume $V_{4B}$ of the third annular region 4, which is calculated from $R_4$ to 62.5 microns (i.e., the outer diameter of the fiber). In some embodiments $R_3$ equals $R_4$. $R_5$ is the outer radius of the fiber. Also set forth are theoretical cutoff wavelength in nm, mode field diameter at 1310 nm, effective area at 1310 nm, chromatic dispersion at 1310 nm, dispersion slope at 1310 nm, attenuation at 1310 nm, mode field diameter at 1550 nm, effective area at 1550 nm, chromatic dispersion at 1550 nm, dispersion slope at 1550 nm, attenuation at 1550 nm, and 1×10 mm diameter induced bend loss in dB per turn at 1550 nm. In Table 1, these properties are modeled.

TABLE 1

| Property | Profile 1 | Profile 2 | Profile 3 | Profile 4 | Profile 5 | Profile 6 | Profile 7 | Profile 8 | Profile 9 |
|---|---|---|---|---|---|---|---|---|---|
| $\Delta_1$ (%) | 0.35 | 0.35 | 0.38 | 0.34 | 0.34 | 0.37 | 0.36 | 0.4 | 0.35 |
| $\alpha_1$ | 20 | 20 | 20 | 20 | 20 | 20 | 20 | 20 | 20 |
| $R_1$ (µm) | 4.1 | 4.1 | 4.1 | 4.3 | 4.3 | 4 | 4 | 4.1 | 3.9 |
| $\Delta_2$ (%) | 0 | 0 | 0 | 0 | 0 | 0.035 | 0.040 | 0.024 | 0 |
| $R_2$ (µm) | 9.76 | 9.76 | 9.76 | 12.73 | 12.73 | 9.8 | 9 | 12 | 8.5 |
| W (µm) | 6 | 7 | 8 | 6.5 | 4.5 | 6.5 | 12 | 5 | 7 |
| $R_3$ (µm) | 15.76 | 16.76 | 17.76 | 19.23 | 17.23 | 16.3 | 21 | 17 | 15.5 |
| $\Delta_3$ (%) | −0.4 | −0.4 | −0.4 | −0.4 | −0.6 | −0.4 | −0.2 | −1.3 | −0.4 |
| $V_3$ (%$\Delta \cdot$ microns$^2$) | −61.2 | −74.3 | −88.1 | −83.1 | −80.9 | −67.9 | −72 | −188.5 | −67.2 |
| $R_4$ (µm) | 15.76 | 16.76 | 17.76 | 19.23 | 19.23 | 16.3 | 21 | 17 | 15.5 |
| $\Delta_4$ (%) | 0.05 | 0.1 | 0.15 | 0.1 | 0.1 | 0.1 | 0.1 | 0.1 | 0.1 |
| $R_5$ (µm) | 62.5 | 62.5 | 62.5 | 62.5 | 62.5 | 62.5 | 62.5 | 62.5 | 62.5 |
| V4a (%$\Delta \cdot$ microns$^2$) | 33 | 62 | 88 | 53 | 60 | 63 | 46 | 61 | 66 |
| V4b (%$\Delta \cdot$ microns$^2$) | 183 | 363 | 539 | 354 | 354 | 364 | 347 | 362 | 367 |
| Theoretical cutoff (nm) | 1074.4 | 883.1 | 817.2 | 904.3 | 904.3 | 943.2 | 923.7 | 1014.3 | 840.8 |
| MFD at 1310 nm (µm) | 8.5 | 8.8 | 8.5 | 9.0 | 9.0 | 8.9 | 9.0 | 8.7 | 8.6 |
| Aeff at 1310 nm (µm$^2$) | 57.4 | 60.1 | 57.4 | 64.1 | 64.1 | 62.0 | 63.0 | 59.4 | 57.1 |
| Dispersion at 1310 nm (ps/nm/km) | 0.07 | −0.04 | 0.07 | −0.17 | −0.13 | −0.08 | −0.06 | −0.23 | 0.06 |
| Dispersion Slope at 1310 nm (ps/nm$^2$/km) | 0.0887 | 0.0895 | 0.0887 | 0.0869 | 0.0872 | 0.0912 | 0.0909 | 0.0886 | 0.0912 |
| Attenuation at 1310 nm (dB/km) | 0.342 | 0.341 | 0.342 | 0.340 | 0.340 | 0.339 | 0.339 | 0.341 | 0.341 |
| MFD at 1550 nm (µm) | 9.6 | 9.9 | 9.6 | 10.3 | 10.3 | 10.1 | 10.2 | 9.8 | 9.6 |
| Aeff at 1550 nm (µm$^2$) | 70.7 | 74.7 | 70.7 | 80.5 | 80.4 | 77.2 | 78.7 | 73.9 | 70.7 |
| Dispersion at 1550 nm (ps/nm/km) | 17.7 | 17.8 | 17.7 | 17.0 | 17.1 | 18.1 | 18.0 | 17.4 | 18.3 |
| Dispersion Slope at 1550 nm (ps/nm$^2$/km) | 0.0631 | 0.0641 | 31.0697 | 0.0613 | 0.0619 | 0.0653 | 0.0643 | 0.0635 | 0.0650 |
| Attenuation at 1550 nm (dB/km) | 0.194 | 0.193 | 0.194 | 0.193 | 0.193 | 0.192 | 0.191 | 0.193 | 0.193 |
| Bend loss at 1550 nm (dB/10 mm dia. turn) | <0.1 | <0.1 | <0.1 | <0.1 | <0.1 | <0.1 | <0.1 | <0.05 | <0.1 |

| Property | Profile 10 | Profile 11 | Profile 12 | Profile 13 | Profile 14 | Profile 15 | Profile 16 | Profile 17 | Profile 18 |
|---|---|---|---|---|---|---|---|---|---|
| $\Delta 1$ (%) | 0.34 | 0.34 | 0.34 | 0.34 | 0.34 | 0.24 | 0.28 | 0.34 | 0.34 |
| $\alpha_1$ | 20 | 20 | 20 | 20 | 20 | 20 | 20 | 20 | 20 |
| $R_1$ (µm) | 4 | 4 | 4 | 4 | 4.3 | 4.3 | 4.2 | 4 | 4 |
| $\Delta_2$ (%) | 0 | 0 | 0 | 0 | 0 | −0.1 | −0.08 | 0 | 0 |
| $R_2$ (µm) | 9.8 | 9.8 | 10 | 10 | 14 | 14 | 14 | 9.5 | 9.5 |
| W (µm) | 5 | 5 | 4 | 4 | 4 | 7 | 4 | 6 | 6 |
| $R_3$ (µm) | 14.8 | 14.8 | 14 | 14 | 18 | 21 | 18 | 15.5 | 15.5 |
| $\Delta_3$ (%) | −0.7 | −1 | −1.3 | −1.3 | −1.3 | −0.4 | −1.3 | −0.5 | −0.5 |
| $V_3$ (%$\Delta \cdot$ microns$^2$) | −86.1 | −123 | −124.8 | −124.8 | −166.4 | −98 | −166.4 | −75 | −75 |
| R4 (µm) | 14.8 | 14.8 | 14 | 20 | 18 | 21 | 18 | 15.5 | 15.5 |
| $\Delta 4$ (%) | 0.1 | 0.2 | 0.1 | 0.2 | 0.1 | 0 | 0 | 0.01 | 0.03 |
| $R_5$ (µm) | 62.5 | 62.5 | 62.5 | 62.5 | 62.5 | 62.5 | 62.5 | 62.5 | 62.5 |
| V4a (%$\Delta \cdot$ microns$^2$) | 68 | 136 | 70 | 141 | 58 | 46 | 46 | 7 | 20 |
| V4b (%$\Delta \cdot$ microns$^2$) | 369 | 737 | 371 | 701 | 358 | 347 | 287 | 37 | 110 |
| Theoretical cutoff (nm) | 842.7 | 592.8 | 842.7 | 592.8 | 904.3 | 915.2 | 988.1 | 1097.0 | 1035.4 |
| MFD at 1310 nm (µm) | 8.8 | 8.8 | 8.8 | 8.8 | 9.0 | 9.1 | 8.8 | 8.8 | 8.8 |
| Aeff at 1310 nm (µm$^2$) | 59.9 | 59.8 | 59.8 | 59.8 | 64.2 | 65.1 | 61.5 | 59.8 | 59.8 |
| Dispersion at 1310 nm (ps/nm/km) | −0.15 | 0.04 | 0.01 | 0.01 | −0.21 | 0.24 | 0.02 | −0.14 | −0.14 |
| Dispersion Slope at 1310 nm (ps/nm$^2$/km) | 0.0909 | 0.0916 | 0.0917 | 0.0917 | 0.0867 | 0.0856 | 0.0857 | 0.0906 | 0.0906 |

TABLE 1-continued

| | | | | | | | | | |
|---|---|---|---|---|---|---|---|---|---|
| Attenuation at 1310 nm (dB/km) | 0.341 | 0.341 | 0.341 | 0.341 | 0.340 | 0.340 | 0.341 | 0.341 | 0.341 |
| MFD at 1550 nm ($\mu$m) | 9.9 | 9.8 | 9.8 | 9.8 | 10.3 | 10.3 | 10.0 | 9.9 | 9.9 |
| Aeff at 1550 nm ($\mu m^2$) | 74.7 | 74.1 | 74.3 | 74.3 | 80.7 | 81.7 | 77.0 | 74.6 | 74.6 |
| Dispersion at 1550 nm (ps/nm/km) | 18.2 | 18.5 | 18.6 | 18.6 | 16.9 | 17.1 | 16.9 | 18.1 | 18.1 |
| Dispersion Slope at 1550 nm (ps/nm$^2$/km) | 0.0660 | 0.0670 | 0.0673 | 0.0673 | 0.0614 | 0.0595 | 0.0603 | 0.0655 | 0.0655 |
| Attenuation at 1550 nm (dB/km) | 0.193 | 0.193 | 0.193 | 0.193 | 0.193 | 0.193 | 0.193 | 0.193 | 0.193 |
| Bend loss at 1550 nm (dB/10 mm dia. turn) | <0.1 | <0.05 | <0.05 | <0.05 | <0.05 | <0.1 | <0.05 | <0.1 | <0.1 |

The fibers listed above exhibit a modeled theoretical cutoff wavelength which is less than 1100 nm. All of these fibers would exhibit a cable (22 m) cutoff wavelength less than 1260 nm. The following fibers in Table 2 were manufactured using an OVD manufacturing process, each fiber being drawn from their optical fiber preforms at 10 m/s and having a standard primary and secondary urethane acrylate coatings applied thereto. Their properties were then measured.

TABLE 2

| Parameter | Example 19 | Example 20 | Example 21 | Example 22 | Example 23 | Example 24 | Example 25 | Comparative Example 26 |
|---|---|---|---|---|---|---|---|---|
| $\Delta 1$ (%) | 0.37 | 0.35 | 0.35 | 0.34 | 0.37 | 0.40 | 0.40 | 0.33 |
| R1 (microns) | 4.5 | 4.5 | 4.5 | 4.3 | 4.5 | 4.2 | 4.6 | 4.1 |
| Dopant in core region 1 | GeO2 | GeO2 | GeO2 | GeO2 | GeO2 | GeO2 | GeO2 | GeO2 |
| $\Delta 2$ (%) | 0.0 | 0.0 | 0.0 | 0.0 | 0.0 | 0.0 | 0.0 | 0.0 |
| R2 (microns) | 12 | 9.5 | 9.6 | 9.4 | 9.3 | 8 | 8.3 | 9.8 |
| Dopant in inner annular region 2 | none | none | none | none | none | none | none | none |
| $\Delta 3$ (%) | −0.35 | −0.44 | −0.40 | −0.43 | −0.36 | −0.48 | −0.47 | −0.44 |
| R3 (microns) | 20 | 17.9 | 17.5 | 17.7 | 18.1 | 15.8 | 16.5 | 17.9 |
| $V_3$ (%$\Delta \cdot$ microns$^2$) | −73 | −87 | −78 | −87 | −67 | −79 | −76 | −90 |
| R4 (microns) | 20 | 17.9 | 17.5 | 17.7 | 18.1 | 15.8 | 16.5 | 17.9 |
| Dopant in region 3 | F | F | F | F | F | F | F | F |
| $\Delta 4$ (%) | 0.03 | 0.03 | 0.06 | 0.02 | 0.02 | 0.02 | 0.03 | 0.00 |
| R5 (microns) | 62.5 | 62.5 | 62.5 | 62.5 | 62.5 | 62.5 | 62.5 | 62.5 |
| updopant in region 4 | GeO2 | Cl | Cl | Cl | Cl | Cl | Cl | none |
| updopant concentration in region 4 (weight %) | 0.65 | 0.32 | 0.6 | 0.25 | 0.25 | 0.25 | 0.32 | na |
| $V_{4,4}$ updope volume region from R4 to 30 microns, (% delta $\cdot$ microns$^2$) | 15 | 11 | 38 | 8 | 12 | 12 | 17 | 0 |
| Attenuation at 1550 nm (dB/Km) | 0.19 | 0.191 | 0.192 | 0.186 | 0.186 | 0.191 | 0.184 | 0.184 |
| 22 m cutoff (nm) | 1255 | 1266 | 1230 | 1239 | 1220 | 1205 | 1260 | 1351 |
| MFD at 1310 nm (microns) | 8.98 | 8.73 | 8.54 | 8.67 | 8.58 | 8.25 | 8.39 | 8.85 |
| Dispersion zero wavelength | 1320 | 1327 | 1324 | 1326 | 1330 | 1321 | 1315 | 1326 |
| Dispersion Slope at 1310 nm (ps/nm$^2$/km) | 0.084 | 0.086 | 0.085 | 0.087 | 0.086 | 0.088 | 0.087 | 0.087 |
| Bend loss, 10 mm diameter mandrel, dB/turn | 0.06 | 0.017 | 0.071 | 0.043 | 0.084 | 0.027 | 0.044 | 0.084 |
| Bend loss, 15 mm diameter mandrel, dB/turn | na | 0.006 | 0.032 | 0.017 | 0.032 | 0.012 | 0.015 | 0.015 |
| Bend loss, 20 mm diameter mandrel, dB/turn | na | 0.003 | 0.029 | 0.009 | 0.028 | 0.015 | 0.005 | 0.013 |
| Bend loss, 30 mm diameter mandrel, dB/turn | na | 0.002 | 0.010 | 0.002 | 0.002 | 0.001 | 0.001 | 0.001 |

As can be seen in Tables 1 and 2 above, as well as Table 3 below, the examples herein illustrate exemplary fibers which employ a central glass core region having index $\Delta_1$, a first inner annular region having index $\Delta_2$, a depressed annular region having index $\Delta_3$ and a third annular region having index delta percent $\Delta_4$; wherein $\Delta_1 > \Delta_4 > \Delta_2 > \Delta_3$, wherein the difference between $\Delta_4$ and $\Delta_2$ is greater than or equal to 0.01 and an absolute value of profile volume, $|V_3|$ is at least 60% $\Delta\mu m^2$. These fibers exhibit a cable cutoff less than 1260 nm (except for comparative example 26 which did not exhibit a cable cutoff wavelength less than 1260 nm) and a bend loss of less than 0.2 dB/turn when wound on a 10 mm diameter mandrel. These fibers also exhibit a mode field diameter between about 8.2 and 9.5 microns at 1310 nm, a zero dispersion wavelength between 1300 and 1324 nm a mode field diameter between about 8.2 and 9.5 microns at 1310 nm, a dispersion slope at 1310 nm which is less than 0.09 ps/nm²/km, and a bend loss at 1550 nm, when wound on a 10 mm diameter mandrel, of less than 0.2 dB/turn, more preferably less than 0.1 dB/turn, even more preferably less than 0.075 dB/turn, and most preferably less than 0.05 dB/turn. These fibers also exhibit a bend loss at 1550 nm, when wound on a 15 mm diameter mandrel, of less than 0.05 dB/turn, more preferably less than 0.03 dB/turn, a 20 mm diameter mandrel, of less than 0.03 dB/turn, more preferably less than 0.01 dB/turn, and a 30 mm diameter mandrel, of less than 0.01 dB/turn, more preferably less than 0.005 dB/turn.

The following examples set forth in Table 3 below are modeled. While zero dispersion wavelength is not reported for these examples, this wavelength was in all cases between 1300 and 1324 nm.

TABLE 3

| Property | Profile 27 | Profile 28 | Profile 29 | Profile 30 | Profile 31 | Profile 32 | Profile 33 | Profile 34 | Profile 35 |
|---|---|---|---|---|---|---|---|---|---|
| $\Delta_1$ (%) | 0.32 | 0.32 | 0.32 | 0.32 | 0.34 | 0.34 | 0.36 | 0.36 | 0.38 |
| $\alpha_1$ | 12 | 12 | 12 | 12 | 12 | 12 | 12 | 12 | 12 |
| $R_1$ (μm) | 4 | 4 | 4.2 | 4.2 | 4 | 4.2 | 4 | 4.2 | 4 |
| $\Delta_2$ (%) | 0 | 0 | 0 | 0 | 0 | 0 | 0 | 0 | 0 |
| $R_2$ (μm) | 8.7 | 8.7 | 9.1 | 9.1 | 8.7 | 9.1 | 8.7 | 9.1 | 8.7 |
| w (μm) | 8.6 | 9.2 | 8.0 | 9.0 | 8.2 | 7.4 | 7.9 | 6.5 | 7.2 |
| $R_3$ (μm) | 17.3 | 17.9 | 17.2 | 18.1 | 16.9 | 16.5 | 16.6 | 15.6 | 15.9 |
| $\Delta_3$ (%) | −0.45 | −0.45 | −0.45 | −0.45 | −0.45 | −0.45 | −0.45 | −0.45 | −0.45 |
| $V_3$ (%Δ · microns²) | −100 | −110 | −95 | −110 | −95 | −85 | −90 | −72 | −80 |
| $R_4$ (μm) | 17.3 | 17.9 | 17.2 | 18.1 | 16.9 | 16.5 | 16.6 | 15.6 | 15.9 |
| $\Delta_4$ (%) | 0.02 | 0.02 | 0.02 | 0.04 | 0.02 | 0.02 | 0.02 | 0.02 | 0.02 |
| $R_5$ (μm) | 62.5 | 62.5 | 62.5 | 62.5 | 62.5 | 62.5 | 62.5 | 62.5 | 62.5 |
| V4a (%Δ · microns²) | 12.0 | 11.6 | 12.1 | 22.9 | 12.3 | 12.6 | 12.5 | 13.1 | 12.9 |
| V4b (%Δ · microns²) | 72.2 | 71.7 | 72.2 | 143.1 | 72.4 | 72.7 | 72.6 | 73.3 | 73.1 |
| Cable Cutoff (nm) | 1206 | 1234 | 1245 | 1255 | 1226 | 1253 | 1246 | 1252 | 1250 |
| MFD at 1310 nm (μm) | 8.84 | 8.84 | 8.99 | 8.99 | 8.66 | 8.81 | 8.51 | 8.66 | 8.36 |
| Bend loss at 1550 nm (dB/10 mm dia. turn) | 0.09 | 0.04 | 0.07 | 0.06 | 0.06 | 0.07 | 0.04 | 0.1 | 0.05 |

| Property | Profile 36 | Profile 37 | Profile 38 |
|---|---|---|---|
| $\Delta_1$ (%) | 0.38 | 0.4 | 0.4 |
| $\alpha_1$ | 12 | 12 | 12 |
| $R_1$ (μm) | 4.2 | 4 | 4.2 |
| $\Delta_2$ (%) | 0 | 0 | 0 |
| $R_2$ (μm) | 9.1 | 8.7 | 9.1 |
| w (μm) | 5.7 | 6.5 | 4.8 |
| $R_3$ (μm) | 14.9 | 15.2 | 13.9 |
| $\Delta_3$ (%) | −0.45 | −0.45 | −0.45 |
| $V_3$ (%Δ · microns²) | −62 | −70 | −50 |
| $R_4$ (μm) | 14.9 | 15.2 | 13.9 |
| $\Delta_4$ (%) | 0.02 | 0.02 | 0.02 |
| $R_5$ (μm) | 62.5 | 62.5 | 62.5 |
| V4a (%Δ · microns²) | 13.6 | 13.4 | 14.1 |
| V4b (%Δ · microns²) | 73.7 | 73.5 | 74.2 |
| Cable Cutoff (nm) | 1259 | 1255 | 1258 |
| MFD at 1310 nm (μm) | 8.51 | 8.23 | 8.38 |
| Bend loss at 1550 nm (dB/10 mm dia. turn) | 0.12 | 0.06 | 0.17 |

Example 39

An optical fiber was made which exhibited the same general refractive index profile illustrated in FIG. 1, i.e. the fiber comprised a step index GeO2 doped silica central core region 1 having a +0.36% $\Delta_1$, $R_1$=4.5 microns, first inner annular region 2 comprised of undoped silica, having refractive index $\Delta_2$=0, $R_2$=10 microns, a depressed region 3, $R_3$=13 microns, comprising a void-containing (Krypton gas) 0.6 weight % fluorine doped silica starting at about 10 microns (radius) and having a 3 micron radial width ($R_3-R_2$). The third annular region 4 was formed of silica glass doped with chlorine (via $Cl_2$ vapor phase doping during consolidation of the OVD deposited soot), thereby forming an updoped outer cladding region 4 having a +0.02% $\Delta_4$, $R_4$=62.5 microns, with an updope volume $V_{4A}$ from the outer diameter of the moat at 13 microns to a 30 micron radius of the fiber of about 15% $\Delta\mu m^2$. An SEM cross-section end face of a fiber showed an approximately 4.5 micron radius $GeO_2$—$SiO_2$ core surrounded by a 10 micron outer radius void-free near clad region surrounded by 13 micron outer radius void containing cladding region (ring thickness of approximately 3 microns) which is surrounded by a void-free pure silica outer cladding having an outer diameter of about 125 microns (all radial dimensions measured from the center of the optical fiber). The void containing ring region comprised about 6 percent regional area percent holes (100 percent Kr by volume) in that area with an average diameter of 0.17 microns and the smallest diameter holes at 0.03 microns and a maximum diameter of 0.45 microns, resulting in about 400 total number of holes in the fiber cross-section. The total fiber void area percent (area of the holes divided by total area of the optical fiber cross-section ×100) was about 0.1 percent. This fiber was drawn from its preform at 10 m/s and had standard primary and secondary urethane acrylate coatings applied thereto. Properties for this fiber were as follows: attenuation at 1550 nm was 0.204 dB/km; 22 meter cutoff of 1250 nm; 1310 nm mode field diameter was 8.51 microns; bend loss at 1550 nm for 10 mm diameter mandrel was 0.004 dB/turn, bend loss at 1550 nm for 15 mm diameter mandrel was 0.004 dB/turn; bend loss at 1550 nm for 20 mm diameter mandrel was 0.000 dB/turn; bend loss at 1550 nm for 30 mm diameter mandrel was 0.000 dB/turn; zero dispersion wavelength (lambda zero) was 1317 nm, dispersion slope at lambda zero of 0.090 ps/nm²/km. Properties for this fiber show that it is G.652 compliant and has excellent bend loss.

Example 40

Comparative

A similar fiber to Ex 27 optical fiber comprising voids but without updoping the overclad was made and had a MFD at 1310 nm of 8.41 microns, a 22 m cutoff of 1355 nm, bend loss at 1550 nm for 10 mm diameter mandrel was 0.015 dB/turn, bend loss at 1550 nm for 15 mm diameter mandrel was 0.009 dB/turn; bend loss at 1550 nm for 20 mm diameter mandrel was 0.000 dB/turn; bend loss at 1550 nm for 30 mm diameter mandrel was 0.000 dB/turn; zero dispersion wavelength (lambda zero) was 1317 nm, dispersion slope at lambda zero of 0.090 ps/nm²/km. This fiber did not meet the G.652 standards for 22 m cutoff. The results show the fiber with updoping (EX 27) had a 105 nm lower cutoff while maintaining a similar MFD and bend performance.

It is to be understood that the foregoing description is exemplary only and is intended to provide an overview for the understanding of the nature and character of the fibers which are defined by the claims. The accompanying drawings are included to provide a further understanding of the preferred embodiments and are incorporated and constitute part of this specification. The drawings illustrate various features and embodiments which, together with their description, serve to explain the principals and operation. It will become apparent to those skilled in the art that various modifications to the preferred embodiments as described herein can be made without departing from the spirit or scope of the appended claims.

What is claimed is:

1. An optical fiber comprising:
a central glass core region comprising maximum refractive index delta percent $\Delta_1$, a first inner annular region surrounding said core comprising refractive index delta percent $\Delta_2$, a depressed annular region surrounding said inner annular region and comprising $\Delta_3$ and a third annular region surrounding the depressed annular region comprising refractive index delta percent $\Delta_4$; wherein $\Delta_{1MAX}>\Delta_4>\Delta_2>\Delta_3$, wherein the difference between $\Delta_4$ and $\Delta_2$ is greater than or equal to 0.01 and a profile volume, $V_3$, equal to:

$$V_3 = 2\int_{r2}^{r3} \Delta(r)r\,dr$$

wherein $|V_3|$ is at least 60% $\Delta\mu m^2$, and said fiber exhibits a cable cutoff less than 1260 nm.

2. The optical fiber of claim 1, wherein said fiber exhibits a bend loss of less than 0.2 dB/turn when wound on a 10 mm diameter mandrel.

3. The optical fiber of claim 1, wherein the difference between $\Delta_4$ and $\Delta_2$ is greater than 0.05.

4. The optical fiber of claim 1, wherein the volume $V_4$ of the third annular region 4, when calculated from the inner radius of annular region 4 to a radial distance of 30 microns from the centerline of the fiber, is greater than 5% $\Delta\mu m^2$.

5. The optical fiber of claim 2, wherein the volume $V_4$ of the third annular region 4, when calculated from the inner radius of annular region 4 to a radial distance of 30 microns from the centerline of the fiber, is greater than 5% $\Delta\mu m^2$.

6. The optical fiber of claim 1, wherein the difference between $\Delta_4$ and $\Delta_2$ is between about 0.01 and 0.05.

7. The optical fiber of claim 1, wherein said fiber exhibits zero dispersion at a wavelength between 1300 and 1324 nm.

8. The optical fiber of claim 1, wherein said fiber exhibits a mode field diameter at 1310 nm between about 8.2 and 9.5.

9. The optical fiber of claim 1, wherein said fiber comprises a profile volume, $|V_3|$ of at least 70% $\Delta\mu m^2$.

10. The optical fiber of claim 9, wherein said fiber exhibits a bend loss at 1550 nm wavelength of less than 0.1 dB/turn on a 10 mm diameter mandrel.

11. The optical fiber of claim 1, wherein said fiber exhibits a bend loss at 1550 nm wavelength of less than 0.1 dB/turn on a 10 mm diameter mandrel.

12. The optical fiber of claim 9, wherein said fiber exhibits a 22 m cable cutoff less than 1260 nm.

13. The optical fiber of claim 1, wherein said fiber exhibits a 22 m cable cutoff less than 1260 nm.

14. The optical fiber of claim 1, wherein $\Delta_4$ of the third annular region is greater than 0.01 percent.

15. The optical fiber of claim 13, wherein the third annular region comprises Cl in an amount greater than 2000 ppm.

16. The optical fiber of claim 1, wherein the third annular region extends at least to the point where the optical power which would be transmitted through the optical fiber is greater than or equal to 90% of the optical power transmitted along the fiber.

* * * * *